US012746668B2

(12) United States Patent
Boxer et al.

(10) Patent No.: US 12,746,668 B2
(45) Date of Patent: Sep. 29, 2026

(54) SYSTEMS AND METHODS FOR CONTROLLING A ROBOT

(71) Applicant: Universal City Studios LLC, Universal City, CA (US)

(72) Inventors: Eric Ross Boxer, Orlando, FL (US); Eric To Chan, Orlando, FL (US); Michael James Gebhardt, Winter Garden, FL (US)

(73) Assignee: Universal City Studios LLC, Universal City, CA (US)

( * ) Notice: Subject to any disclaimer, the term of this patent is extended or adjusted under 35 U.S.C. 154(b) by 62 days.

(21) Appl. No.: 18/890,367

(22) Filed: Sep. 19, 2024

(65) Prior Publication Data

US 2025/0100139 A1 Mar. 27, 2025

Related U.S. Application Data

(60) Provisional application No. 63/619,169, filed on Jan. 9, 2024, provisional application No. 63/539,883, filed on Sep. 22, 2023.

(51) Int. Cl.

| | |
|---|---|
| ***B25J 9/16*** | (2006.01) |
| ***B25J 9/00*** | (2006.01) |

(52) U.S. Cl.

CPC ........... *B25J 9/1661* (2013.01); *B25J 9/0084* (2013.01); *B25J 9/163* (2013.01)

(58) Field of Classification Search

CPC ......... B25J 9/1661; B25J 9/0084; B25J 9/163

See application file for complete search history.

(56) References Cited

U.S. PATENT DOCUMENTS

| | | | |
|---|---|---|---|
| 6,831,436 | B2 | 12/2004 | Gonzalez |
| 8,185,647 | B2 | 5/2012 | Sodergren |

(Continued)

FOREIGN PATENT DOCUMENTS

| | | | |
|---|---|---|---|
| CN | 115052718 | A | 9/2022 |
| DE | 102010004476 | A1 | 7/2011 |

(Continued)

OTHER PUBLICATIONS

PCT/US2024/047669 International Search Report and Written Opinion mailed Jan. 17, 2025.

(Continued)

*Primary Examiner* — Mohamad O El Sayah

(74) *Attorney, Agent, or Firm* — Fletcher Yoder, P.C.

(57) ABSTRACT

A multi-sectional robot includes a first robot configured to communicate via a first protocol and a second robot coupled to the first robot and configured to communicate via a second protocol. Further, the multi-sectional robot includes a controller that operates based on a third protocol, receives movement commands to move the multi-sectional robot, determines a status of the multi-sectional robot, determines an operational profile for the first robot and the second robot based on the movement commands and the status, translates at least a first portion of the operational profile from the third protocol to a first translation in the first protocol, translates at least a second portion of the operational profile from the third protocol to a second translation in the second protocol, outputs the first translation to the first robot as first operational instructions, and outputs the second translation to the second robot as second operational instructions.

21 Claims, 4 Drawing Sheets

(56) References Cited

U.S. PATENT DOCUMENTS

| | | | | |
|---|---|---|---|---|
| 8,588,972 | B2 * | 11/2013 | Fung | H04W 4/00<br>446/454 |
| 10,814,484 | B2 | 10/2020 | Preisinger et al. | |
| 11,351,680 | B1 * | 6/2022 | Rosenberg | B25J 19/0095 |
| 11,878,408 | B2 | 1/2024 | Jeromin et al. | |
| 2005/0151496 | A1 * | 7/2005 | Furuta | B62D 57/02<br>318/568.12 |
| 2008/0133052 | A1 * | 6/2008 | Jones | B25J 5/007<br>455/39 |
| 2019/0291277 | A1 * | 9/2019 | Oleynik | B25J 9/1669 |
| 2021/0213604 | A1 * | 7/2021 | Lee | B25J 17/00 |
| 2024/0066683 | A1 * | 2/2024 | Yoon | B25J 9/16 |
| 2024/0181647 | A1 * | 6/2024 | Gildert | B25J 9/1694 |
| 2024/0408355 | A1 * | 12/2024 | Collette | A61B 34/25 |
| 2025/0026508 | A1 * | 1/2025 | Kim | B60L 58/10 |

FOREIGN PATENT DOCUMENTS

| | | | |
|---|---|---|---|
| EP | 1496668 | A1 | 1/2005 |
| EP | 1644782 | B1 | 3/2009 |
| EP | 2868445 | A1 | 5/2015 |
| WO | 2012102442 | A1 | 8/2012 |
| WO | 2018153474 | A1 | 8/2018 |

OTHER PUBLICATIONS

Suarez Raul et al, "Development of a Dexterous Dual-Arm Omni-directional Mobile Manipulator," IFAC PapersOnLine, Jan. 1, 2018, pp. 126-131, vol. 51, No. 22.

* cited by examiner

SYSTEMS AND METHODS FOR CONTROLLING A ROBOT

CROSS-REFERENCE TO RELATED APPLICATIONS

This application claims priority to and the benefit of U.S. Provisional Application No. 63/619,169, filed Jan. 9, 2024, entitled "SYSTEMS AND METHODS FOR CONTROLLING A ROBOT," and U.S. Provisional Application No. 63/539,883, filed Sep. 22, 2023, entitled "SYSTEMS AND METHODS FOR CONTROLLING A ROBOT," each of which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An amusement park may include a show robot (e.g., an animatronic figure) that interacts with or otherwise entertains park guests of the amusement park. For example, the show robot may be positioned along a ride path of an attraction of the amusement park or at a particular location in the amusement park to contribute to an overall theme of the attraction or location. The show robot may move through preprogrammed positions or acts when guests are directed past (e.g., via a ride vehicle of the attraction) or walk past the show robot. As such, the show robot may enhance a guest's immersive experience provided by the attraction or themed amusement park location having the show robot. It is now recognized that it may be desirable to employ multiple robots as components of a multi-sectional show robot. Accordingly, it is also desirable to provide systems and methods for managing such a multi-sectional show robot as a homogeneous unit.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a multi-sectional robot includes a first robot configured to communicate via a first protocol and a second robot coupled to the first robot and configured to communicate via a second protocol. Further, the multi-sectional robot includes a controller including a processing system and a memory, the memory encoded with instructions configured to be executed by the processing system to cause the controller to operate based on a third protocol and receive one or more movement commands to move the multi-sectional robot. Moreover, the instructions are executed by the processing system to cause the processing system to determine a status of the multi-sectional robot, determine an operational profile for the first robot and the second robot based on the one or more movement commands and the status, wherein the operational profile comprises one or more robotic control operations, and translate at least a first portion of the operational profile from the third protocol to a first translation in the first protocol. Additionally, the instructions are executed by the processing system to cause the processing system to translate at least a second portion of the operational profile from the third protocol to a second translation in the second protocol and output the first translation to the first robot as first operational instructions and output the second translation to the second robot as second operational instructions.

In an embodiment, a method for operating a multi-sectional robot includes receiving, via a controller of a first robot, one or more movement commands in a first protocol, determining via the controller of the first robot, a status of the multi-sectional robot, and determining, via the controller of the first robot, an operational profile for a second robot and a third robot based on the one or more movement commands and the status, wherein the operational profile comprises one or more robotic control operations. The method further includes translating, via the controller of the first robot, at least a first portion of the operational profile from the first protocol to a first translation in a second protocol, translating via the controller of the first robot, at least a second portion of the operational profile from the first protocol to a second translation in a third protocol, and outputting, via the controller of the first robot, the first translation to the second robot as first operational instructions and output the second translation to the third robot as second operational instructions.

In an embodiment, a multi-sectional robot includes a first robot configured to communicate via a first protocol and a second robot coupled to the first robot and configured to communicate via a second protocol. Further, the multi-sectional robot includes a controller including a processing system and a memory, the memory encoded with instructions configured to be executed by the processing system to cause the controller to operate based on a third protocol and receive positional data from the first robot in the first protocol. Further, the instructions are executed by the processing system to cause the processing system to translate the positional data into translated positional data in the third protocol and determine an operational profile for the second robot based on the translated positional data and a coordination control algorithm or based on the translated positional data and a coordination control library, wherein the operational profile includes or is indicative of one or more robotic control operations. Additionally, the instructions are executable by the processing system to cause the processing system to translate at least a portion of the operational profile from the third protocol to a translated operational profile in the second protocol and output the translated operational profile to the second robot as operational instructions.

Various refinements of the features noted above may be undertaken in relation to various aspects of the present disclosure. Further features may also be incorporated in these various aspects as well. These refinements and additional features may exist individually or in any combination.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
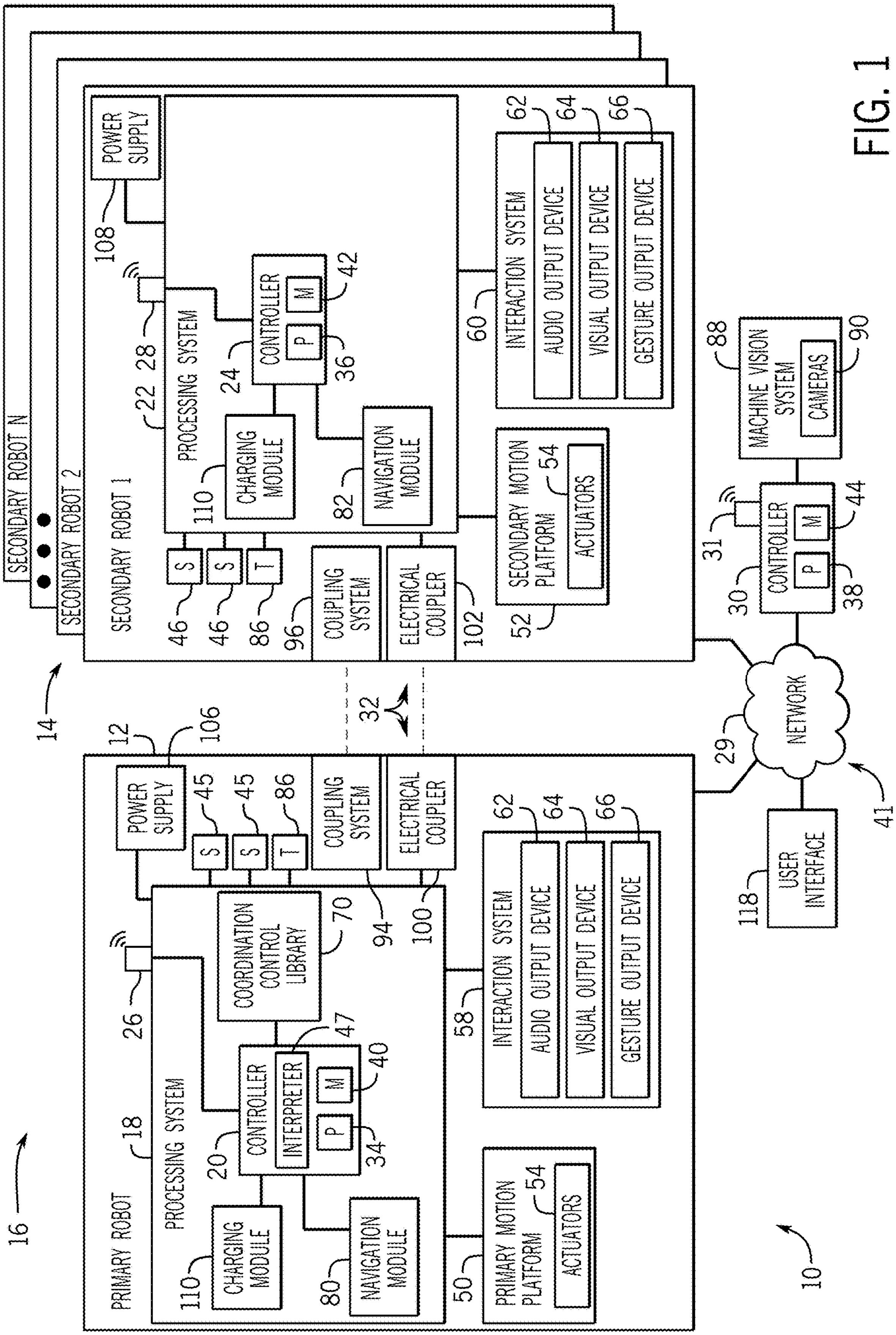
FIG. 1 is a schematic view of a multi-sectional robot having a primary robot and a plurality of secondary robots, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to a multi-sectional robot, which may be configured to travel along an amusement park environment to interact with and/or provide a performance (e.g., a show) to guests of the amusement park. The multi-sectional show robot may include a primary robotic section (e.g., a base robot), also referred to herein as a "primary robot," and a plurality of secondary robot sections (e.g., a plurality of parasitic robots), also referred to herein as "secondary robots." The primary robot may include a primary motion platform that enables the multi-sectional show robot to traverse a terrain, such as various regions or areas of the amusement park along which guests may be located. For example, the primary motion platform may include a propulsion system having one of more wheels, tracks, legs, and/or other suitable mechanisms or devices that enable the primary motion platform to propel the multi-sectional show robot along a path. The secondary robot may include an animated figure system that forms at least a portion of a theme or character (e.g., dragon, wolf, or other creature) of the multi-sectional robot. Particularly, the animated figure system may include one or more actuatable extremities or appendages (e.g., arms, head), themed covering structures (e.g., fur, scaling), audio output devices (e.g., acoustic speakers), and/or visual output devices (e.g., lighting features, displays) that may enhance a guest's perceived realism of the theme or character portrayed by the multi-sectional show robot.

As discussed in detail below, the secondary robot may be one of a plurality of secondary robots that can be removably coupled to the primary robot. Accordingly, various secondary robots having different theming or characters may be interchangeably equipped on the primary robot. In this manner, an overall theme or character of the multi-sectional show robot may be easily and quickly adjusted by replacing the type (e.g., particular theme or character) of secondary robot coupled to the primary robot. The secondary robots may communicate via different protocols than the primary robot, thus, the primary robot may be configured to translate operational instructions to the different protocols associated with each of the secondary robots. To this end, the multi-sectional show robot may utilize the same motion platform (e.g., the primary robot) to provide a plurality of uniquely themed robotic systems with which guests may interact, thereby reducing an overall manufacturing complexity and/or maintenance cost of the multi-sectional show robot (e.g., as compared to producing individual show robots for each theme or character).

In an embodiment, a user may use an input device (e.g., a handheld controller), which may include one or more joysticks and/or one or more buttons, to send one or more movement commands to move the multi-sectional robot. It should be noted that any suitable input device that may enable the user to input data, commands, and/or information may be used. In an embodiment, the user may use a handheld object (e.g., a prop) and/or gestures (e.g., hand gestures, arm gestures, prop gestures) to send the one or more movement commands to move the multi-sectional robot. The primary robot of the multi-sectional robot may include a controller, which may receive the one or more movement commands via a first protocol (e.g., from the handheld controller, the handheld object, gestures). The controller may determine a status (e.g., a position, an orientation, a state) of some or all of the secondary robots. In an embodiment, the controller may filter the one or more movement commands based on the status. Further, the controller may access a coordination control library, which may include a set of rules for defining robotic control operations and/or algorithms, to determine an operational profile that may correlate to the one or more movement commands and the status. The operational profile (e.g., an animation profile associated with a particular character or character type) may be indicative of one or more robot control operations for the multi-sectional robot.

A first secondary robot may be configured to communicate via a second protocol different from the first protocol and a second secondary robot may be configured to communicate via a third protocol different from the first protocol and the second protocol. Thus, the controller may translate a first portion of the operational profile from the first protocol to the second protocol for transmission to the first secondary robot. Additionally, the controller may translate a second portion of the operational profile from the first protocol to the third protocol for transmission to the second secondary robot. The controller may then transmit (e.g., output) the first translation to the first secondary robot as first operational instructions and the second translation to the second secondary robot as second operational instructions either simultaneously or at different time periods.

In an embodiment, the controller may receive positional data from the first secondary robot via the second protocol and translate the positional data into the first protocol associated with the controller. The controller may then determine the operational profile for the second secondary robot based on the translated positional data and a coordination control library (e.g., a library of operational profiles for one or more characters, types of characters, mood depictions). The controller may then translate a portion of the operational profile from the first protocol to the third protocol associated with the second secondary robot. Moreover, the controller may transmit the translated operational profile to the second secondary robot as operational instructions.

With the foregoing in mind, FIG. 1 is a schematic view of a robotic system 10 having a primary robot 12 and a plurality of secondary robots 14 (collectively referred to herein as secondary robots 14 for convenience) that, collectively, may form a multi-sectional robot 16. It should be noted that while FIG. 1 illustrates multiple of the secondary robots 14, embodiments may include a sole secondary robot configured to cooperate with the primary robot 12. The primary robot 12 includes a first processing system 18 having a first controller 20 and each of the secondary robots 14 respectively includes a second processing system 22 having a second controller 24. The first controller 20 may be communicatively coupled to a first communication component 26 of the primary robot 12 and the second controller 24 may be communicatively coupled to a second communication component 28 of the respective one of the secondary robots 14.

In some embodiments, the first and second communication components 26, 28 enable communication (e.g., data transmission, signal transmission) between the first controller 20 and the second controller 24 via one or more wireless communication channels using one or more wireless communication protocols. The second controller 24 for each of the secondary robots 14 may utilize differing protocols. In some embodiments, the first and second controllers 20, 24 may be communicatively coupled to one another via a network 29 and a system controller 30 of the robotic system 10. For example, the system controller 30 may include a communication component 31 enabling the system controller 30 to receive (e.g., via the network 29) communication signals from the first controller 20 and to transmit the communication signals (e.g., via the network 29) to the second controller 24, and vice versa. It should be noted that the system controller 30 may also communicate via the one or more wireless communication channels using the one or more wireless communication protocols. Further, as discussed below, the first and second controllers 20, 24 may be communicatively coupled via wired communication channels that may be included in respective electrical coupling systems 32 of the primary and secondary robots 12, 14. It should be understood that the first and second controllers 20, 24 and/or the system controller 30 may filter irrelevant data being transmitted via the network 29.

The first controller 20, the second controller 24, and the system controller 30 each include respective processors 34, 36, 38 and memory devices 40, 42, 44. The processors 34, 36, 38 may include microprocessors, which may execute software for controlling component of the primary and secondary robots 12, 14, for analyzing sensor feedback acquired by respective sensors of the primary and secondary robots 12, 14, and/or for controlling any other suitable components of the robotic system 10. The processors 34, 36, 38 may include multiple microprocessors, one or more "general-purpose" microprocessors, one or more special-purpose microprocessors, and/or one or more application specific integrated circuits (ASICs), or some combination thereof. For example, the processors 34, 36, 38 may include one or more reduced instruction set computer (RISC) processors. The memory devices 40, 42, 44 may include volatile memory, such as random access memory (RAM), and/or nonvolatile memory, such as read-only memory (ROM). The memory devices 40, 42, 44 may store information, such as control software (e.g., control algorithms for controlling the primary and/or secondary robots 12, 14), look up tables, configuration data, communication protocols, etc.

For example, the memory devices 40, 42, 44 may store processor-executable instructions including firmware or software for the processors 34, 36, 38 to execute, such as instructions for controlling any of the components of the primary and secondary robots 12, 14 discussed herein and/or for controlling other suitable components of the robotic system 10. In some embodiments, the memory devices 40, 42, 44 may be tangible, non-transitory, machine-readable media that may store machine-readable instructions for the processors 34, 36, 38 to execute. The memory devices 40, 42, 44 may include ROM, flash memory, hard drives, any other suitable optical, magnetic, or solid-state storage media, or a combination thereof.

Additionally, the first controller 20 of the primary robot may include an interpreter component 47, which may enable a translation of a first protocol to a second protocol (e.g., the second protocol is different from the first protocol) associated with a respective one of the secondary robots 14. The interpreter component 47 may understand a data format and communication method of a received command of the controller protocol and convert (e.g., using translation logic) the controller protocol into a compatible format for transmission to the respective secondary robot 14. In this manner, the processing system 18 may transmit the command via the translated protocol to the respective secondary robot 14.

It should be understood that any of the processes and techniques disclosed herein may be fully or partially performed by the first processing system 18, the second processing system 22, and/or the system controller 30, which may collectively be referred to herein as a computing system 41. Thus, the computing system 41 may include the first processing system 18, the second processing system 22, the system controller 30, or any combination thereof. Accordingly, it should be appreciated that discussions herein relating to executing control processes or routines, storing data, forming control outputs, and/or performing other operations via the computing system 41 are intended to denote computational operations that may be performed partially or completely by the first processing system 18 of the primary robot 12, the second processing system 22 of the secondary robot 14, and/or the system controller 30.

The first controller 20 may be communicatively coupled to one or more first sensors 45 of the primary robot 12 and the second controller 24 may be communicatively coupled to one or more second sensors 46 of the secondary robot 14. The first and second sensors 45, 46 may acquire feedback (e.g., sensor data) of various operational parameters of the primary and secondary robots 12, 14 and may enable the processing system 18 to determine a status (e.g., a position) of the primary and secondary robots 12, 14. The first and second sensors 45, 46 may provide (e.g., transmit) the acquired feedback to the first and second controllers 20, 24, respectively. As a non-limiting example, the first and second sensors 45, 46 may include proximity sensors, acoustic sensors, cameras, infrared sensors, and/or any other suitable sensors. As such, feedback acquired by the first and/or second sensors 45, 46 may facilitate operation of the multi-sectional robot 16 in accordance with the techniques discussed herein.

In the illustrated embodiment, the primary robot 12 includes a primary motion platform 50 (e.g., a first propulsion system) configured to propel the primary robot 12 along a path and the secondary robot 14 includes a secondary motion platform 52 (e.g., a second propulsion system) configured to propel the secondary robot 14 along the path or another suitable path. The referenced paths may include any positional transition between points via any form of movement (e.g., rotation, translation). The primary and secondary motion platforms 50, 52 each may include one or more corresponding actuators 54 (e.g., electric motors, hydraulic motors, pneumatic motors) that enable the primary and secondary motion platforms 50, 52 to move the primary and secondary robots 12, 14. As an example, the one or more actuators 54 may be configured to drive one or more wheels, tracks, legs, propellers, and/or other suitable mechanisms or devices of the primary and secondary motion platforms 50, 52 that enable movement of the primary and secondary robots 12, 14. The primary and secondary motion platforms 50, 52 may be communicatively coupled to the first controller 20 and the second controller 24, respectively. To this end, the first and second controllers 20, 24 may send instructions to the primary and secondary motion platforms 50, 52 (e.g., to the corresponding one or more actuators 54) to cause the primary and secondary motion platforms 50, 52 to move the primary and secondary robots 12, 14 along corresponding paths.

In the illustrated embodiment, the primary robot 12 includes a first interaction system 58 (e.g., a first animated figure system) and the secondary robot 14 includes a second interaction system 60 (e.g., a second animated figure system). The first and second interaction systems 58, 60 may each include one or more audio output devices 62 (e.g., speakers), one or more visual output devices 64 (e.g., lights, displays, projectors, etc.), and one or more gesture output devices 66 (e.g., movable appendages such as arms or a head, other actuatable mechanical features) that, as discussed in detail below, may enable the multi-sectional robot 16 to perform a show and/or interact with users (e.g., guests of an amusement park). The first interaction system 58 may be communicatively coupled to the first controller 20 and the second interaction system 60 may be communicatively coupled to the second controller 24. As such, the first and second controllers 20, 24 may instruct the first and second interaction systems 58, 60 to output audio, visual, or gesture outputs at designated time periods.

In some embodiments, the first processing system 18 includes a coordination control library 70. The coordination control library 70 may be stored on the memory device 40 and may include various functions or algorithms that, when executed, enable the controllers 20, 24 to control the first and second interaction systems 58, 60. The coordination control library 70 may include a set of rules, which may define the robotic control operations for the primary robot 12 and each of the secondary robots 14. The set of rules may define input and corresponding output parameters used to control robotic movement. In an embodiment, the set of rules may be pre-defined within the coordination control library 70 at initial configuration of the multi-sectional robot 16. For example, the coordination control library 70 may be specified to include types of audio recordings, visual displays, and/or gesture movements to be output by the respective audio output devices 62, visual output devices 64, or gesture output devices 66 of the primary and secondary robots 12, 14. Further, the first controller 20 may determine an operational profile to execute one or more movement commands by accessing data correlated to the one or more movement commands and the status of the multi-sectional robot 16 within the coordination control library 70. In this manner, the coordination control library 70 may enable coordination between the primary and secondary robots 12, 14 to perform smooth (e.g., fluid) and more integrated movements by the multi-sectional robot 16. Further, the coordination control library 70 may facilitate depiction of particular movement traits of the multi-sectional robot 16, such as movement traits that are associated with a particular character (e.g., a unique character personality), character type (e.g., type of animal), mood (e.g., sulky, energetic), and the like.

In certain embodiments, the first processing system 18 includes a first navigation module 80 and the second processing system 22 includes a second navigation module 82 that may be executed by the respective processor 34, 36. The first and second navigation modules 80, 82 may include control algorithms or other processor-executable routines that enable the first and second controllers 20, 24 to determine locations of the primary robot 12 and the secondary robot 14, respectively, and to facilitate movement of the primary and secondary robots 12, 14 along desired paths. For example, in certain embodiments, the navigation modules 80, 82 may facilitate processing of tracking signals received from respective tracking sensors 86 (e.g., global positioning system [GPS] sensors) of the primary and secondary robots 12, 14, which may be configured to monitor the respective locations of the primary and secondary robots 12, 14 in an environment (e.g., a designated roaming area of the amusement park). For clarity, as used herein, a "roaming area" may correspond to a region of space, such as a walkway or courtyard, along which the primary robot 12, the secondary robot 14, or both, may be configured to travel.

In some embodiments, robotic system 10 includes a machine vision system 88 that, as discussed in detail below, may facilitate tracking of the primary and/or secondary robots 12, 14 in addition to, or in lieu of, the tracking sensors 86. For example, the machine vision system 88 may include one or more cameras 90 or other image sensors configured to acquire image data (e.g., real-time video feeds) of the primary and secondary robots 12, 14 as the primary and secondary robots 12, 14 travel across an environment. The system controller 30 may be configured to analyze the image data acquired by the machine vision system 88 and, based on such analysis, extract the status of the primary and secondary robots 12, 14.

In the illustrated embodiment, the primary robot 12 includes a first coupling system 94 and the secondary robot 14 includes a second coupling system 96. The first and second coupling systems 94, 96 enable the primary and secondary robots 12, 14 to selectively couple (e.g., physically attach) or decouple (e.g., physically detach) from one another. As a non-limiting example, the first and second coupling systems 94, 96 may include permanent magnets, electromagnets, electrical, hydraulic, and/or pneumatic actuators, cables or tethers, robotic manipulators (e.g., grippers, end effectors) and/or any other suitable devices or systems that facilitate transitioning the multi-sectional robot 16 between an assembled or engaged configuration, in which the primary and secondary robots 12, 14 are coupled (e.g., physically coupled, mechanically coupled) to one another, and a detached or disengaged configuration, in which the primary and secondary robots 12, 14 are decoupled (e.g., decoupled, mechanically detached) from one another.

In certain embodiments, the primary robot 12 may include a first electrical coupler 100 (e.g., a male plug or socket) and the secondary robot 14 may include a second electrical coupler 102 (e.g., a female plug or socket). These first and second electrical couplers 100, 102 form at least a portion of the electrical coupling systems 32. The first and second electrical couplers 100, 102 may facilitate wired communication between the primary and secondary robots 12, 14 in addition to, or in lieu of, the wireless communication channels that may be provided by the first and second communication components 26, 28. The first and second electrical couplers 100, 102 may be configured to electrically couple to one another when the primary robot 12 is physically coupled to the secondary robot 14 via engagement of the first and second coupling systems 94, 96. To this end the first and second electrical couplers 100, 102 facilitate transmission of data signals and/or electrical power from the primary robot 12 to the secondary robot 14, and vice versa.

In the illustrated embodiment, the primary robot 12 may include a first power supply 106 (e.g., a first battery module) configured to provide electrical power to components of the primary robot 12. The secondary robot 14 may include a second power supply 108 (e.g., a second battery module) configured to provide electrical power to components of the secondary robot 14. In an engaged (e.g., coupled) configuration of the primary and secondary robots 12, 14 (e.g., in the assembled configuration of the multi-sectional robot 16), the first and second electrical couplers 100, 102 may enable flow of electrical current between the first and second power supplies 106, 108. The controllers 20, 24 may regulate power flow through the electrical couplers 100, 102 and between the first and second power supplies 106, 108, such that the first power supply 106 may be used to charge the second power supply 108, or vice versa. Respective charging modules 110 of the first and second processing systems 18, 22 may execute on the controllers 20, 24 to enable the controllers 20, 24 to monitor, regulate, and/or otherwise adjust electrical power flow between the first and second power supplies 106, 108. It should be appreciated that, in other embodiments, the primary and secondary robots 12, 14 may include wireless power transfer devices (e.g., inductive-based charging systems) that enable wireless electrical power transfer between the first power supply 106 and the second power supply 108.

In some embodiments, the robotic system 10 includes a user interface 118 that may be communicatively coupled (e.g., via the network 29) to the primary robot 12, the secondary robot 14, and/or any other suitable components of the robotic system 10. The user interface 118 may receive user inputs to enable user-based control of the multi-sectional robot 16 or subcomponents thereof. In an embodiment, the user interface 118 may include a handheld controller, which may enable a user to interact with the robotic system 10 through physical input, such as by using one or more buttons, one or more joysticks, a touch pad, or any other suitable control mechanism integrated into the handheld controller.

It should be noted that some or all of the components described herein with respect to the primary robot 12 and the secondary robots 14, such as the primary and secondary motion platforms 50, 52, the first and second interaction system 58, 60, the navigation modules 80, 82, the first and second coupling systems 94, 96 may be included in either one of the primary robot 12 or at least one of the secondary robots 14 (e.g., but not both). For example, the primary robot 12 may include the interaction system 58, while the secondary robots 14 do not include the interaction system 60. It should be noted that this example is merely illustrative, and, in an embodiment, either some or all of the components may be excluded from either the primary robot 12 or the secondary robots 14.

Figure 2:
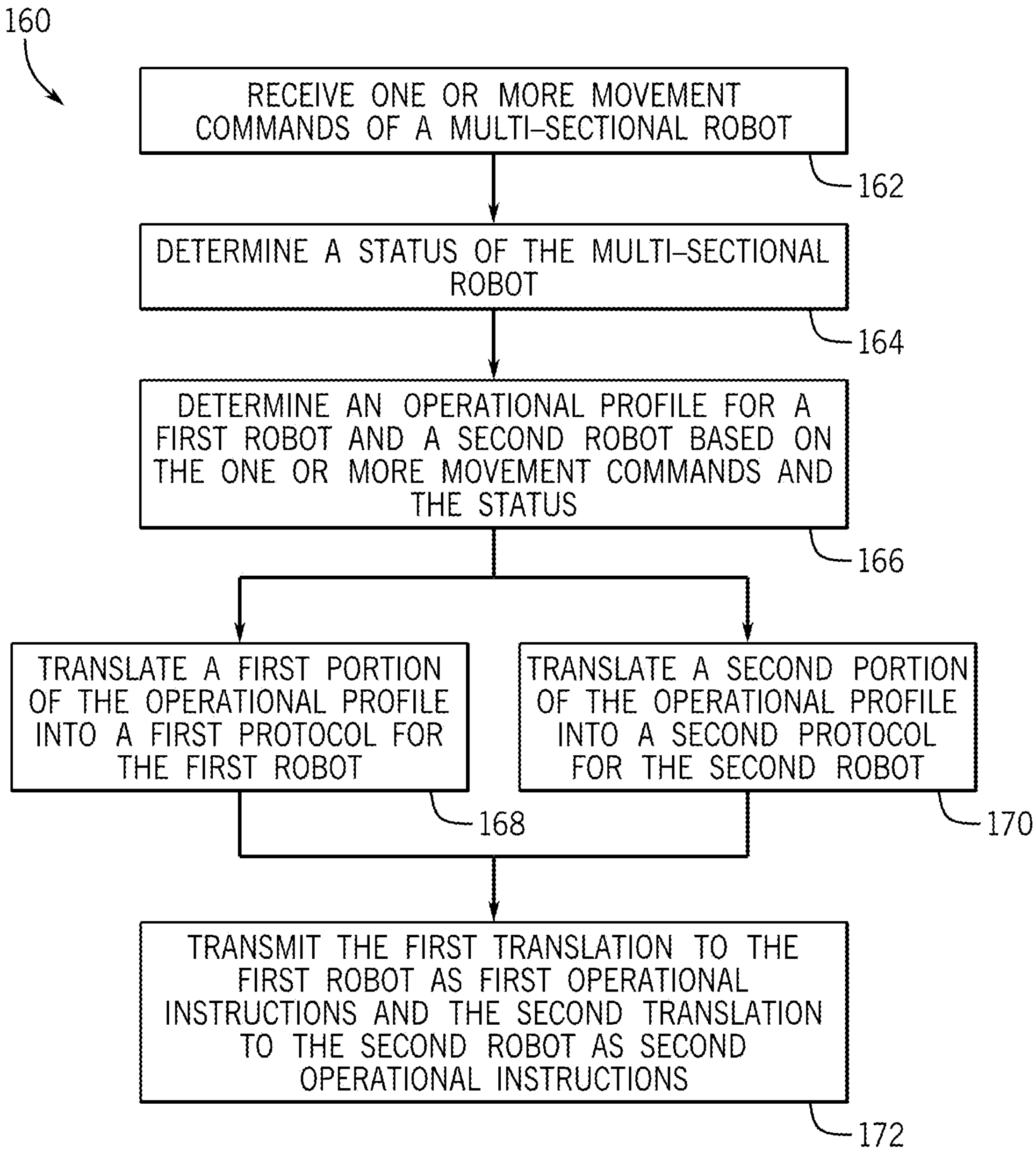
FIG. 2 is a flow diagram of a method for instructing a movement of the multi-sectional robot based on one or more movement commands, in accordance with embodiments of the present disclosure.

FIG. 2 is a flow diagram of a method 160 for instructing a movement of the multi-sectional robot 16 based on one or more movement commands, in accordance with embodiments of the present disclosure. The method 160 disclosed herein includes various steps represented by blocks. It should be noted that at least some steps of the method 160 may be performed by one or more of the controllers 20, 24, and 30. Although the flow chart illustrates the steps in a certain sequence, it should be understood that the steps may be performed in any suitable order and certain steps may be carried out simultaneously, where appropriate.

At process block 162, the first controller 20 may receive the one or more movement commands (e.g., one or more inputs) to move the multi-sectional robot. The one or more movement commands may include gross motor robotic instructions such as commands to move forward (e.g., ahead), backward (e.g., reverse), left, right, stop, rotate, go to a location, follow an object or person, return to base, and so on. The one or more movement commands may include a momentary command (e.g., executed for a brief duration) or a stream of continuous commands (e.g., a sequence of instructions given one after the other). For example, the momentary command may include performing a wave gesture, sit, stand, and so on. As another example, the stream of continuous commands may include overall directional movement of the multi-sectional robot 16 while turning a head of the multi-sectional robot 16 in a direction the multi-sectional robot 16 is moving toward. In an embodiment, the one or more movement commands may be input by a user via the user interface (e.g., using a handheld controller, a prop, and so on). The one or more movement commands may include instructions to move the multi-sectional robot 16 in a desired direction and/or to perform particular actions. For example, the user may manipulate a joystick of the handheld controller in an upward and rightward direction to send the one or more movement commands of moving forward and to the right to the multi-sectional robot 16. Moreover, the one or more movement commands may be communicated to the first controller 20 via a controller protocol.

At process block 164, the first controller 20 may determine a status (e.g., a position, an orientation, a state) of the multi-sectional robot 16, such as whether the multi-sectional robot 16 is seated, standing, walking, rotating, stationary, and so on. For example, the state may include that the multi-sectional robot 16 is seated, standing, walking, rotating, stationary, and so on. The first controller 20 may receive data from the sensors (e.g., 45, 46, and/or 86) and/or the machine vision system 88 and analyze the data to determine whether a first robot (e.g., a first secondary robot 14A of FIG. 4) and/or a second robot (e.g., a second secondary robot 14B of FIG. 4) are extended (e.g., straightened), bent, rotated, raised, lowered, traveling, stationary, and so on. The first controller 20 may analyze the position of the first robot and/or the second robot to determine the status of the multi-sectional robot 16. For example, the machine vision system 88 may capture and provide image data of the second robot (e.g., a leg of the multi-sectional robot 16) being bent and lowered. Additionally or alternatively, the sensors 46, 86 (e.g., a motion sensor, a tracking sensor) may provide feedback that may indicate that the second robot is stationary. Thus, the first controller 20 may determine the status of the multi-sectional robot 16 is in a seated position based on the image data and the feedback. In an embodiment, the status of the multi-sectional robot 16 may be determined based on feedback from each of various secondary robots (e.g., first secondary robot 14A and second secondary robot 14B) after translation and assessment of the feedback, as will be discussed further below.

In another embodiment, the status of the multi-sectional robot 16 may be defined (e.g., define by the first controller 20) and transmitted from the first controller 20 to the various secondary robots based on a particular command. Statuses may limit certain operational functionality (e.g., movement options) while the status is in force. For example, if the one or more movement commands include a command to sit, and the multi-sectional robot 16 is in a seated position, then the status of the first robot and the second robot may be the status of sitting resulting in limiting a range of motion (e.g., a sit status may be enforced to prevent robotic legs from performing a walk function). As another example, if the one or more movement commands include the command to stop movement (e.g., stop animation), and the multi-sectional robot 16 is not moving (e.g., motors of the multi-sectional robot 16 have been powered down), then the status of the first robot and the second robot may be the status of stationary. Enforcing a stationary status may include powering down certain motors until the stationary status is cleared or replaced. Thus, the status of at least one of the various secondary robots may be identified based on pre-defined statuses stored in the coordination control library 70 associated with the particular commands.

At process block 166, the first controller 20 may identify an operational profile for the first robot and the second robot based on the one or more movement commands and the status. The operational profile may be indicative of one or more robotic control operations. Moreover, the operational profile may include functional capabilities (e.g., movement, speed, degrees of freedom, sensing, and so on), communication protocols (e.g., communication protocols associated with each robot), and limitations, such as battery (e.g., battery charge level, power output, weight), temperature range, movement range, and so on. For example, the operational profile may be based on or associated with a character profile of the character. Indeed, the functional capabilities may be designed to match or mimic a specific set of traits (e.g., actions, speech, interaction style) of the character. Each respective communication protocol may include a set of rules that dictates how information is exchanged between two or more devices (e.g., the primary robot 12 and/or the secondary robots 14). For example, the communication protocol may provide the set of rules that govern how information is structured, exchanged, and interpreted between the two or more devices.

The first controller 20 may determine the operational profile by accessing data correlated to the one or more movement commands and the status within the coordination control library 70. As described herein, the coordination control library 70 may include the set of rules, which may define the robotic control operations for the first robot and the second robot. The robotic control operations may manage and direct actions, movements, and/or functions of the multi-sectional robot 16 and involve the use of the actuators 54, the sensors 45, 46, 86, the communication components 26, 28 and/or the control algorithms to enable movement of the multi-sectional robot 16. The robotic control operations for the first robot and the second robot may be used together in the operational profile based on the status.

In an embodiment, the coordination control library 70 may include a layered animation model (e.g., structure, platform). Further, the first controller 20 may employ the layered animation model to execute one or more movements and/or behaviors. For example, the first controller 20 may receive a command from the user to move the multi-sectional robot forward and to the right, which may be processed as a first layer (e.g., base layer) operation. Moreover, the first controller 20 may apply a second layer to animate a head of the multi-sectional robot 16 in the same direction as the multi-sectional robot 16 moves. Additionally or alternatively, the first controller 20 may employ the control algorithms to blend the first layer and the second layer to enable integration of animations and/or movements of the multi-sectional robot 16. It should be noted that the coordination control library 70 may include any suitable number of layers to enable additional animations and/or movements for the multi-sectional robot 16. In an embodiment, the user may dynamically overlay each additional layer to cause each additional animation and/or movement.

In an embodiment, the first controller 20 may determine the operational profile by performing a coordination control algorithm based on the one or more movement commands and the status. For example, the first controller 20 may receive the one or more movement commands and the status, process (e.g., perform a calculation, filter, sort, aggregate, and so on) the one or more movement commands and the status, implement decision-making logic, which may evaluate the processed data and apply pre-defined rules, and arrive at the determination.

In an embodiment, the first controller 20 may filter the one or more movement commands based on the status of the multi-sectional robot to identify one or more filtered movement commands. For example, the first controller 20 may determine the status of the multi-sectional robot 16 is a seated position, and thus, may filter out data from the coordination control library 70 unrelated to the seated position and determine one or more filtered movement commands within the coordination control library 70. The first controller 20 may then determine the operational profile by accessing data correlated to the one or more filtered movement commands. By performing such a filtering operation (e.g., based on status), present embodiments may streamline processor operation, creating efficiencies that improve computational and control operations.

In an embodiment, the first controller 20 may apply one or more mathematical operators to the one or more movement commands. The mathematical operators may be applied by performing mathematical operations on the one or more movement commands to determine the operational profile for the first robot and the second robot. For example, a result of the applied mathematical operation may be associated with the operational profile. In an embodiment, the one or more movement commands may be associated with a control sequence within the coordination control library 70. The control sequence may be defined in the coordination control library 70 and may be associated with a series of outputs. As an example, the control sequence may include a defined set of commands associated with the character or the character type. For example, a first control sequence may include a first defined set of commands associated with a first character or a first character type, and a second control sequence may include a second defined set of commands associated with a second character or a second character type. It should be noted that the first defined set of commands may either be the same as or similar to the second defined set of commands or different from the second defined set of commands. Thus, the first controller 20 may determine the operational profile based on the control sequence associated with the one or more movement commands within the coordination control library 70.

As mentioned above, the first controller 20 may receive the one or more movement commands via the controller protocol. Further, the first robot may be configured to communicate via a first protocol and the second robot may be configured to communicate via a second protocol. The controller protocol, the first protocol, and/or the second protocol may be different from one another. With this in mind, at process block 168 the first controller 20 may translate a first portion of the operational profile into the first protocol for the first robot. Additionally, at process block 170, the first controller 20 may translate a second portion of the operational profile into the second protocol for the second robot. In an embodiment, the first controller 20 may communicate with a controller (e.g., a second controller of the first robot) of the first robot to identify the first protocol and a controller (e.g., a second controller of the second robot) of the second robot to identify the second protocol. In an embodiment, the first protocol of the first robot and the second protocol of the second robot may be defined in the coordination control library 70. After determining the protocol of the robot the first controller 20 is attempting to communicate with, the first controller 20 may perform conversion (e.g., translation) of the controller protocol to the desired protocol compatible with the desired robot. It should be noted that while this example embodiment includes communications to first and second robots, in other embodiments additional robots may be included. Further, the protocols of multiple robots may be identified by the first controller 20 and employed for translation purposes based on a library of translation data.

As an example, the first controller 20 may communicate via a user datagram (UDP) protocol. Thus, the one or more movement commands may be received in the UDP protocol. The first controller 20 may identify the first robot communicates via a Modbus protocol and the second robot communicates via a controller area network (CAN) protocol. Therefore, the first controller 20 may translate the first portion of the operational profile from the controller protocol to the Modbus protocol. Additionally, the first controller 20 may translate the second portion of the operational profile from the controller protocol to the CAN protocol.

As another example, in an embodiment, the first controller 20 may receive the one or more movement commands in the first protocol. The first controller 20 may then translate the one or more movement commands into the corresponding operational instructions (e.g., animation instructions) using the second protocol associated with the second robot. For example, upon receiving the animation instructions via the first protocol, the first controller 20 may translate the animation instructions to the second protocol for transmission to the second robot.

At process block 172 the first controller 20 may transmit the first translation to the first robot as first operational instructions (e.g., a first set of one or more outputs) and the second translation to the second robot as second operational instructions (e.g., a second set of one or more outputs). The first operational instructions and the second operational instructions may include instructions to perform one or more tasks to achieve functions and/or movements according to the one or more movement commands. The operational instructions may include instructions to activate or deactivate an actuator, rotate a rotor a certain magnitude of rotation (e.g., 45 degrees, 90 degrees, and so on), move the multi-sectional robot 16 along the primary and secondary motion platforms 50, 52 a certain distance (e.g., 10 feet, 15 feet, 20 feet, and so on), adjust the visual output device 64 (e.g., turn on one or more lights coupled to the multi-sectional robot), adjust the audio output device 62 (e.g., play one or more sounds), adjust the gesture output device 66, and so on.

For example, based on the one or more movement commands of moving forward and to the right, the second operational instructions may instruct the actuator 54 of the second robot (e.g., the leg of the multi-sectional robot 16) to pivot about an axis of a joint and, thus, enable the second robot to facilitate movement across a surface. Further, the first operational instructions may instruct the actuator 54 (e.g., a motor-driven actuator) of the first robot (e.g., a head of the multi-sectional robot 16) to rotate the first robot to a desired angle according to the movement of the multi-sectional robot 16. In this manner, the actuator 54 may perform mechanical actuations based on the first operational instructions. In an embodiment, the first controller 20 may transmit the first translation and the second translation simultaneously. In another embodiment, the first controller 20 may transmit the first translation during a first time period and the second translation during a second time period. It should be noted that although the method 160 is described above with respect to the first robot and the second robot, any suitable number of robots may be implemented in the method 160.

Further, in an embodiment, the first controller 20 may receive feedback indicative of the movement of the multi-sectional robot 16. For example, the first controller 20 may receive data from the sensors 45, 46, 86 and/or the machine vision system 88 and analyze the data to determine whether the first robot and the second robot fully performed the first operational instructions and/or the second operational instructions. The first controller 20 may translate the feedback from the first protocol (e.g., if received from the first robot) and/or the second protocol (e.g., if received from the second robot) to the controller protocol. If the first controller 20 determines the first robot and/or the second robot partially performed the first operational instructions and/or the second operational instructions, then the first controller 20 may adjust the first portion of the operational profile and the second portion of the operational profile. The first controller 20 may then translate the adjusted first portion of the operational profile and/or the adjusted second portion of the operational profile from the controller protocol to the first protocol and/or the second protocol. The first controller 20 may then transmit the adjusted first portion of the operational file and the adjusted second portion of the operational profile to enable the multi-sectional robot 16 to fully complete the first operational instructions and the second operational instructions.

Figure 3:
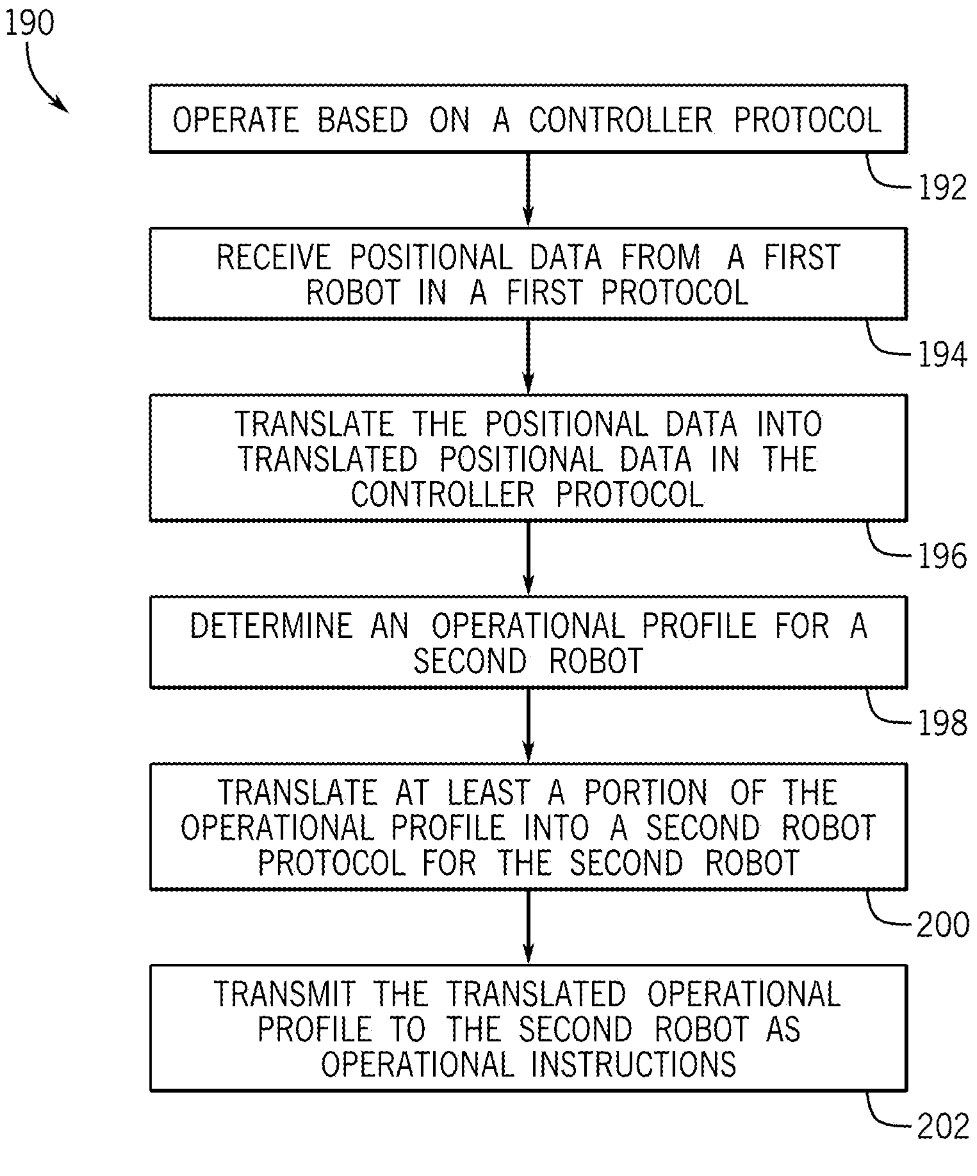
FIG. 3 is a flow diagram of a method for instructing a movement of the multi-sectional robot based on positional data, in accordance with embodiments of the present disclosure.

FIG. 3 is a flow diagram of a method 190 for instructing a movement of the multi-sectional robot 16 based on positional data, in accordance with embodiments of the present disclosure. The method 190 disclosed herein includes various steps represented by blocks. It should be noted that at least some steps of the method 190 may be performed by one or more of the controllers 20, 24, and 30. Although the flow chart illustrates the steps in a certain sequence, it should be understood that the steps may be performed in any suitable order and certain steps may be carried out simultaneously, where appropriate. Further, it should be noted that the method 190 may be employed by the multi-sectional robot 16 as a single entity, by several robots independently, and/or by multiple subsystems within the multi-sectional robot 16.

At process block 192, as described above, the first controller 20 may operate based on the controller protocol. The first robot may be configured to communicate via the first protocol. Thus, at process block 194, the first controller 20 may receive positional data from the first robot in the first protocol. For example, the first controller 20 may receive data indicative of a position and/or location of the first robot from the one or more sensors 46 and/or the one or more tracking sensors 86. For example, the first robot may be an arm of the multi-sectional robot 16, and the first controller 20 may detect, using the one or more sensors 46, 86 the first robot is moving toward an object (e.g., a box) on the floor.

At process block 196, the first controller 20 may translate the positional data into translated positional data in the controller protocol. As described above, the first controller 20 may perform the conversion of the data received from the first robot via the first protocol to the controller protocol. In this manner, the conversion may enable the first controller 20 to analyze the data in its own format (e.g., the controller protocol) rather than in a native format (e.g., the first protocol). At process block 198, the first controller 20 may determine an operational profile for the second robot. In an embodiment, the first controller 20 may determine the operational profile for the second robot based on the translated positional data and the coordination control algorithm. In an embodiment, the first controller 20 may determine the operational profile for the second robot based on the translated positional data and the coordination control library 70. As described herein, the operational profile may be indicative of one or more robotic control operations.

At process block 200, the first controller 20 may translate at least a portion of the operational profile into the second robot protocol for the second robot. For example, the first controller 20 may convert the portion of the operational profile from the controller protocol to the second protocol to enable transmission. In an embodiment, the first controller 20 may filter data from the coordination control library 70 and perform the translation based on the status of the multi-sectional robot 16 and a priority level (e.g., low, medium, or high priority level) associated with the status. The status and associated priority level may be pre-defined in the coordination control library 70. For example, the status indicative of a collision may be associated with a high priority level. Thus, the first controller 20 may filter data to enable the portion of the operational profile associated with a collision response to be translated with higher priority. By performing such a filtering operation, present embodiments may enable a faster data retrieval and translation (e.g., by minimizing scanning through irrelevant data), an increase in computational power, and a conservation of resources (e.g., by processing and translating data that is relevant).

At process block 202, the first controller 20 may transmit the translated operational profile to the second robot as operational instructions. As an example, based on the positional data indicating the first robot is moving toward the object on the ground, the operational profile may include operational instructions that may instruct the actuator 54 of the second robot, which may be a leg of the multi-sectional robot 16, to bend. For example, the second robot may perform mechanical actuations based on the operational instructions. Further, as an example, the operational instructions may include specific actuations. In this manner, the bend may enable the multi-sectional robot 16 to move closer to the object on the ground, and may enable the multi-sectional robot 16 to reach or grab the object.

Figure 4:
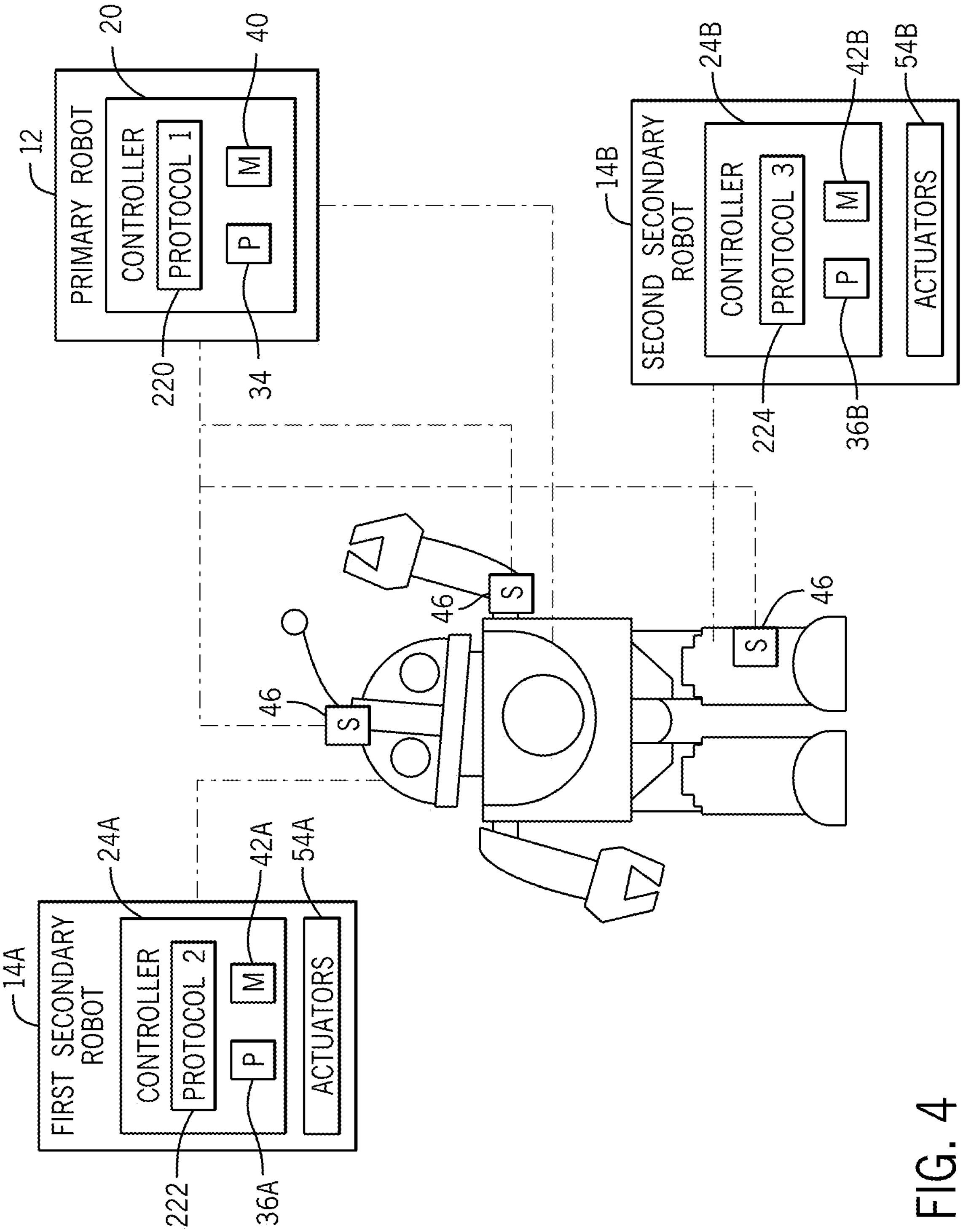
FIG. 4 is a schematic view of the multi-sectional robot, in accordance with embodiments of the present disclosure.

With the foregoing in mind, FIG. 4 is a schematic view of the multi-sectional robot 16, in accordance with embodiments of the present disclosure. The multi-sectional robot 16 may include the primary robot 12 that may include the processor 34 and the memory 40, a first secondary robot 14A that may include a processor 36A and a memory 42A, and a second secondary robot 14B that may include a processor 36B and a memory 42B. The primary robot 12 may communicate in a first protocol 220, the first secondary robot 14A may communicate in a second protocol 222, and the second secondary robot 14B may communicate in a third protocol.

As described herein, the first controller 20 may receive the one or more movement commands in a first protocol 150. For example, the one or more movement commands may be to transition to a seated position. The first controller 20 may determine the status of the robot based on feedback from the one or more sensors 46. In the illustrated example, the one or more sensors 46 may provide feedback of an arm (e.g., an appendage) of the multi-sectional robot 16 being raised and in motion, a head of the multi-sectional robot (e.g., the first secondary robot 14A) moving in accordance with the arm, and a leg (e.g., the second secondary robot 14B) being stationary. Thus, the status may be that the multi-sectional robot 16 is waving at guests.

The first controller 20 may determine the operational profile for the first secondary robot 14A and the second secondary robot 14B based on the one or more movement commands and the status. The first controller 20 may then translate at least a first portion of the operational profile from the first protocol 220 to the second protocol 222 for transmission to the first secondary robot 14A as first operational instructions. Additionally, the first controller 20 may translate at least a second portion of the operational profile from the first protocol 220 to the third protocol 224 for transmission to the second secondary robot 14B as second operational instructions.

The operational profile may include the operational instructions, which may enable the multi-sectional robot 16 to perform the movements according to the one or more movement commands. Thus, for example, the first operational instructions may instruct an actuator 54A of the first secondary robot 14A (e.g., the head) to cease movement. Additionally, the second operational instructions may instruct an actuator 54B of the second secondary robot 14B (e.g., the leg) to bend so that the multi-sectional robot 16 may transition to the seated position.

Accordingly, the embodiments described herein may enable the multi-sectional robot to perform operations agnostically. For example, operations may be understood, applied, or carried out in various situations and may be implemented in a streamlined and efficient manner. Thus, processing power in performing the operations may be reduced and efficiency may be improved.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A multi-sectional robot, comprising:

a first robot configured to communicate via a first protocol;

a second robot coupled to the first robot and configured to communicate via a second protocol that is different than the first protocol; and a controller comprising a processing system and a memory, the memory storing a library of operational profiles and encoded with instructions configured to be executed by the processing system to cause the controller to:

operate based on a third protocol that is different from the first protocol and the second protocol;

receive one or more movement commands to move the multi-sectional robot;

determine a status of the multi-sectional robot;

determine an operational profile for the first robot and the second robot by identifying the operational profile in the stored library of operational profiles based on the one or more movement commands and the status, wherein the operational profile comprises one or more robotic control operations;

translate at least a first portion of the operational profile from the third protocol to a first translation in the first protocol;

translate at least a second portion of the operational profile from the third protocol to a second translation in the second protocol; and transmit the first translation to the first robot as first operational instructions in the first protocol to cause the first robot to perform one or more first movements associated with the one or more movement commands; and transmit the second translation to the second robot as second operational instructions in the second protocol to cause the second robot to perform one or more second movements associated with the one or more movement commands.

2. The multi-sectional robot of claim 1, wherein the instructions are configured to be executed by the processing system to cause the controller to determine the operational profile by accessing data correlated to the one or more movement commands and the status within the library of operational profiles.

3. The multi-sectional robot of claim 2, wherein the library of operational profiles comprises a set of rules defining robotic control operations for the first robot and the second robot that are used together in the operational profile based on the status.

4. The multi-sectional robot of claim 1, wherein the instructions are configured to be executed by the processing system to cause the controller to determine the operational profile by performing a coordination control algorithm based on the one or more movement commands and the status.

5. The multi-sectional robot of claim 1, wherein the instructions are configured to be executed by the processing system to cause the controller to:

filter the one or more movement commands based on the status to identify one or more filtered movement commands; and determine the operational profile by accessing data correlated to the one or more filtered movement commands.

6. The multi-sectional robot of claim 1, wherein the first robot is configured to perform first mechanical actuations based on the first operational instructions and the second robot is configured to perform second mechanical actuations based on the second operational instructions.

7. The multi-sectional robot of claim 1, wherein the instructions are configured to be executed by the processing system to cause the controller to output the first translation to the first robot and output the second translation to the second robot simultaneously.

8. The multi-sectional robot of claim 1, wherein the instructions are configured to be executed by the processing system to cause the controller to output the first translation to the first robot and output the second translation to the second robot according to a sequence.

9. The multi-sectional robot of claim 1, wherein the instructions are configured to be executed by the processing system to cause the controller to translate the one or more movement commands into the third protocol, wherein the one or more movement commands comprise one or more momentary movement commands or a stream of one or more continuous commands.

10. The multi-sectional robot of claim 1, wherein:

the one or more movement commands comprise gross motor robotic instructions for the multi-sectional robot; and the first operational instructions and the second operational instructions comprise specific actuations.

11. The multi-sectional robot of claim 1, wherein the status of the first robot, the status of the second robot, or both, is defined by one or more sensors of the multi-sectional robot.

12. The multi-sectional robot of claim 1, comprising a machine vision system configured to acquire image data of the first robot, the second robot, or both, wherein the status of the first robot, the second robot or both is defined at least in part by the image data.

13. The multi-sectional robot of claim 1, wherein the first robot and the second robot comprise actuators, audio output devices, and visual output devices configured to be controlled by the first operational instructions and the second operational instructions, respectively.

14. The multi-sectional robot of claim 1, wherein the library of operational profiles comprises one or more functional capabilities of the first robot and the second robot, one or more protocols associated with the first robot and the second robot, and one or more limitations associated with the first robot and the second robot.

15. The multi-sectional robot of claim 1, wherein the operational profile is associated with a character profile of a character and comprises a set of actions, speech, interaction style, or any combination thereof of the character.

16. A method for operating a multi-sectional robot, comprising:

storing, at a memory of a first robot, a library of operational profiles;

receiving, via a controller of the first robot, one or more movement commands in a first protocol;

determining, via the controller of the first robot, a status of the multi-sectional robot;

determining, via the controller of the first robot, an operational profile for a second robot and a third robot by identifying the operational profile in the stored library of operational profiles based on the one or more movement commands and the status, wherein the operational profile comprises one or more robotic control operations;

translating, via the controller of the first robot, at least a first portion of the operational profile from the first protocol to a first translation in a second protocol that is different than the first protocol;

translating, via the controller of the first robot, at least a second portion of the operational profile from the first protocol to a second translation in a third protocol that is different from the first protocol and the second protocol; and outputting, via the controller of the first robot, the first translation to the second robot as first operational instructions in the first protocol to cause the second robot to perform one or more first movements associated with the one or more movement commands and outputting the second translation to the third robot as second operational instructions in the third protocol to cause the third robot to perform one or more second movements associated with the one or more movement commands.

17. The method of claim 16, comprising:

applying, via the controller of the first robot, one or more mathematical operators to the one or more movement commands to obtain a result; and determining, via the controller of the first robot, the operational profile for the second robot and the third robot based on the result.

18. The method of claim 16, wherein the controller of the first robot outputs the first translation to the second robot and the second translation to the third robot via a network protocol.

19. A multi-sectional robot, comprising:

a first robot configured to communicate via a first protocol;

a second robot coupled to the first robot and configured to communicate via a second protocol that is different than the first protocol; and a controller comprising a processing system and memory, the memory storing a library of operational profiles and encoded with instructions configured to be executed by the processing system to cause the controller to:

receive positional data from the first robot in the first protocol;

translate the positional data into translated positional data in a third protocol that is different than the first protocol and the second protocol;

determine an operational profile for the second robot by identifying the operational profile in the stored library of operational profiles based on the translated positional data and a coordination control algorithm, wherein the operational profile includes or is indicative of one or more robotic control operations;

translate at least a portion of the operational profile from the third protocol to a translated operational profile in the second protocol; and output the translated operational profile to the second robot as operational instructions.

20. The multi-sectional robot of claim 19, wherein the operational instructions comprise instructions to activate an actuator, rotate a rotor, move along a primary motion platform, move along a secondary motion platform, adjust a visual output device, adjust an audio output device, adjust a gesture output device, or any combination thereof.

21. The multi-sectional robot of claim 19, wherein the instructions are configured to be executed by the processing system to cause the controller to:

receive feedback indicative of a movement of the multi-sectional robot; and adjust the operational profile in response to determining the multi-sectional robot partially performed the movement.

* * * * *